April 6, 1926.

G. B. TODD 1,579,581

FERTILIZER DISTRIBUTOR

Filed Jan. 28, 1924    2 Sheets-Sheet 1

Inventor

George B. Todd.

By Mason Fenwick & Lawrence

Attorneys

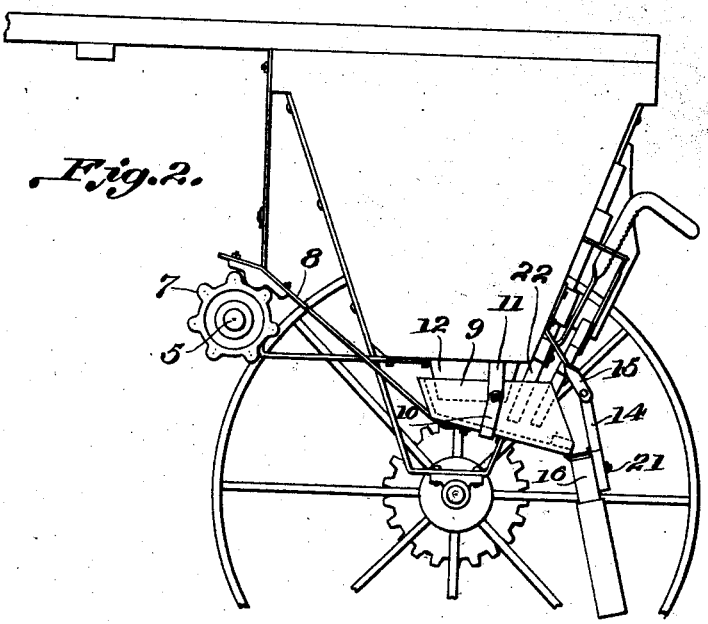
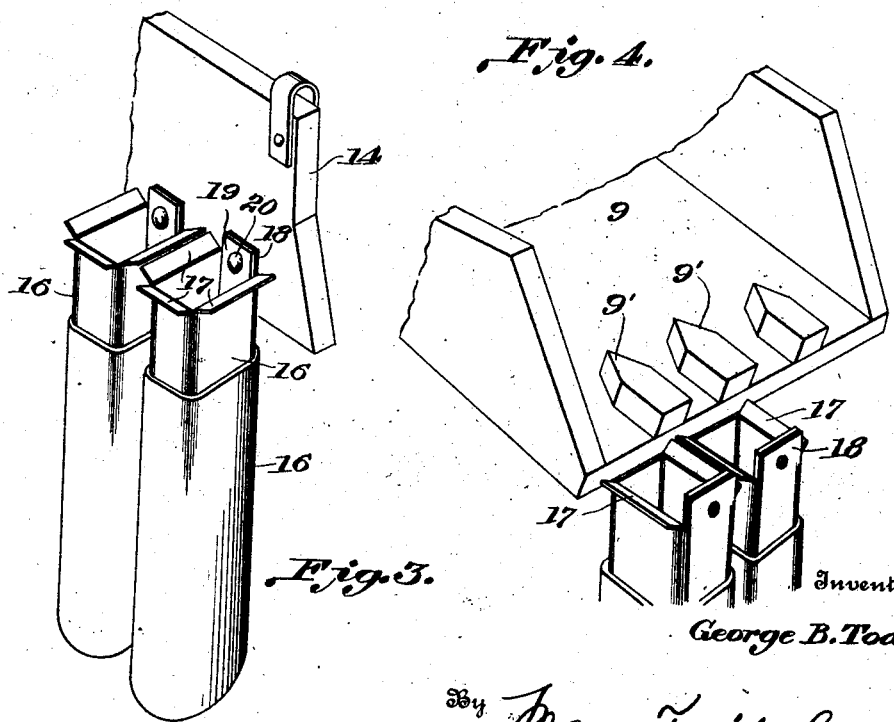

Patented Apr. 6, 1926.

1,579,581

UNITED STATES PATENT OFFICE.

GEORGE B. TODD, OF NORFOLK, VIRGINIA.

FERTILIZER DISTRIBUTOR.

Application filed January 28, 1924. Serial No. 689,098.

*To all whom it may concern:*

Be it known that I, GEORGE B. TODD, a citizen of the United States, residing at Norfolk, in the county of Norfolk and State of Virginia, have invented certain new and useful Improvements in Fertilizer Distributors; and I do hereby declare the following to be a full, clear, and exact description of the invention, such as will enable others skilled in the art to which it appertains to make and use the same.

This invention relates to fertilizer distributors and has for its object to provide a machine which will embody means for shutting off the flow of fertilizer from a plurality of chutes by a common operating means; means for adjusting the flow of fertilizer from the individual chutes; and to provide a simple and efficient head through which the fertilizer is distributed after discharge from the chute. The above and other features of the invention will become more clearly apparent as the description proceeds and will be defined in the appended claims.

In the drawings, Fig. 1 is a rear perspective view of the improved fertilizer distributor.

Fig. 2 is an end elevation of the same.

Fig. 3 is a perspective view of the head to which the distributing pipes are secured, only a fragment of the head being shown; and Fig. 4 is a perspective view showing the relation between the discharge end of the chute and the mouths of the distributing or tubular members, the parts being omitted.

Figure 1:
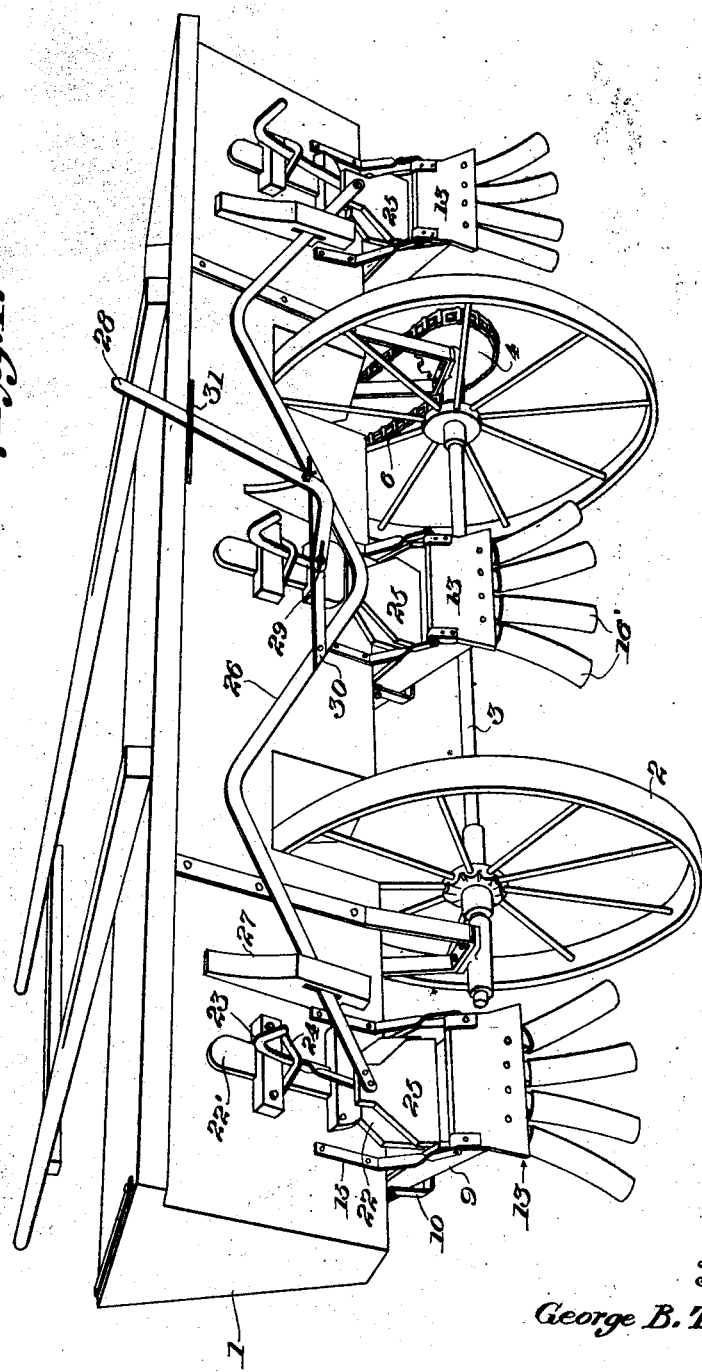

Referring to the drawings, 1 indicates a hopper adapted to receive fertilizer, the same being supported in any suitable manner on wheels 2. The wheels are mounted on a shaft 3 at one end of which is a sprocket wheel 4 which is adapted to drive a shaft 5 in front of the receptacle or hopper 1 by means of a sprocket chain 6.

Mounted on the shaft 5 is a plurality of toothed wheels 7, one wheel for each chute provided on the machine. Adapted to coact with the wheel 7 is an arm 8 which is secured to the bottom of a chute 9 which is hung by stirrups 10 from brackets 11 depending from the bottom of the hopper. Rocking motion will be imparted to the chute 9 as the teeth on the wheel 7 wipe the free end of the arm 8 as will be readily understood.

In the bottom of the hopper 1 is a discharge spout opening or discharging into the chutes 9. Suspended at the discharge end of the chutes 9 are heads generally indicated at 13, said heads having tubular members connected thereto into which the fertilizer from the chute is received and distributed.

The head 13 comprises a board 14 which is pivotally suspended from the hopper 1 by means of brackets 15 extending from the latter. Mounted on the board 15 adjacent the lower end of the same is a plurality of tubular members 16 of substantially rectangular form. The members 16 are made from sheet metal and the upper end of each member is provided with three laterally diverging and inclined lips 17 formed by slitting the corners of the tubular member and bending the material outward as indicated to form said lips. One of the sections of material formed by slitting the tube as said is allowed to project upwardly to form a tab or extension 18 which serves as a support for securing the tubular member to the board 14. The securing means cooperating with the tab 18 preferably comprises a rectangular washer 19 and a bolt 20 passing through said washer 19 and said tab 18 and through the board 14, the bolt 20 being provided with a nut 21 to permit the tubular member 16 to be held in the desired angular position in order to obtain the desired spread of fertilizer. Cooperating with the tube 16 is a cylindrical member preferably in the form of a hose 16' which is adapted to be slipped over the lower end of the rectangular tube 16.

The discharge end of the chute 9 is provided with a plurality of pointed blocks 9' arranged in spaced relation on the bottom board of the chute, said blocks serving to direct the fertilizer into well defined streams between said blocks whereby the fertilizer will be received into the mouth or top of the tubular member 16. The forwardly projecting lip 17 on the tubular member 16 underlies the bottom board of the chute 9 and the blocks 9' thereon are disposed in front of the adjacent lips 17 of adjacent tubes 16. Thus the fertilizer will be directed into the open mouth of the tube 16 by means of the blocks 9' and the forwardly extending lips 17 which underlie the bottom of the chute 9 will receive any fertilizer which does not directly pass into the open mouth of the chute.

The tubular members 16 are arranged in close proximity to each other, as close as the adjacent lips 17 will permit, and are adapted to be swung on their pivotal support 20 into various angular positions. The lips 17 at the sides of the tubular member will extend sufficiently over toward the adjacent member 16 to prevent loss of fertilizer between adjacent members. This manner of arranging the tubular members 16 is an important feature of my invention.

It will be understood that the chute 9 is given a rocking motion as the distributor is moved along by means of the toothed wheels 7 and the arm 8 which is connected to the chute. This rocking motion is obvious for the purpose of causing the fertilizer to progress down the chute and into the mouths of the tubes 16.

Individual adjusting means for regulating the flow of fertilizer down the chutes 9 are provided in the form of paddle-like members 22 which may be adjusted by means of any suitable means such as a spring arm 23 adapted to engage with a fixed bar 24. The paddle 22 is provided with an upwardly extending member 22' which is mounted in suitable brackets on the hopper body 1.

Means are also provided for cutting off the flow of fertilizer down the chutes 9, as, for example, when the machine is at rest or when the same is being drawn along where it is not desired to distribute fertilizer, it being understood that any suitable clutch means may be provided to disconnect the driving sprocket 4 on the shaft 3 from the shaft 5. The closing means preferably takes the form of paddle members 25 arranged near the discharge end of the chutes 9 but in front of the blocks 9' thereon. A simple mechanism for raising and lowering the paddle members 25 comprises a bar 26 which is arched to extend over the wheels 2 and slidably supported with respect to the hopper 1 as in brackets 27. A lever 28 is pivotally connected in any suitable manner to the hopper 1 and has a pin and slot connection 29 with the bar 26. The latter is conveniently provided with a bar 30 which carries a pin which engages with a slot in the end of the lever 28. The lever is maintained in locked position, as, for example to hold the paddles 25 elevated by means of a ratchet means 31 on the hopper body.

The operation of the machine will be briefly explained. When it is desired to distribute fertilizer, the shaft 5 is connected in driving relation with the sprocket 4 on the shaft 3 in a suitable manner. The chutes 9 are given a rocking movement by means of the arms 8 which rest on top of the toothed wheels 7 on the shaft 5. The amount of fertilizer flowing down the chute 9 can be regulated by the paddle members 22 each chute being independently regulable. When it is desired to stop the flow of fertilizer from the chutes 9, the same can be accomplished by lowering the paddles or gates 25 against the bottom of the chutes 9, the lowering being continued until the chutes 9 are tilted sufficiently to elevate the free ends of the arms away from the toothed wheels 7. This simple manner of shutting off the flow of fertilizer not only shuts off the flow of fertilizer, but also serves to obviate the necessity of providing mechanical means for disconnecting the driving connection between the shaft 5 on which the toothed wheels 7 are mounted and the sprocket 4 on the shaft 3.

As has been already indicated, the distributing pipes 16' may be swung laterally on their pivotal supports to allow the desired spread of fertilizer to be obtained.

The invention provides a simple and economically manufactured machine for the purpose in view and is very efficient in service.

What I claim is:

1. The combination with a baffle plate, of a plurality of tubular members suspended therefrom, said tubular members being of rectangular form and having laterally diverging lips and a forwardly extending lip.

2. The combination with a baffle plate, of a tubular member of substantially rectangular form having diverging lips at the sides thereof and a third diverging lip between the two side lips, and a tab extension rising from the side of the tubular member, and means pivotally securing the tubular member to said board, said means including said tab extension.

In testimony whereof I affix my signature.

GEORGE B. TODD.